Patented Aug. 19, 1952

2,607,736

UNITED STATES PATENT OFFICE 2,607,736

PHOSPHORUS SULFIDE-TURPENTINE REACTION PRODUCTS AND LUBRICANTS CONTAINING THE SAME

Franklin M. Watkins, Flossmoor, Ill. assignor to Sinclair Refining Company, New York, N. Y., a corporation of Maine No Drawing. Application July 19, 1946, Serial No. 684,777

12 Claims. (Cl. 252—46.6)

In the applications of Robert L. May, Serial Numbers 494,687 and 494,698, filed July 14, 1943, now Patent Numbers 2,486,188 and 2,498,133, respectively, there are described phosphorus sulfide-terpene condensation products effective in repressing or inhibiting the deterioration of lubricating oils and the corrosion of metal parts in contact therewith. My invention is concerned with improvements in these products as prepared from commercial wood turpentine and fractionated turpentines, including the material sold under the name "Pinene 111," which is reported as containing about 92% alpha pinene, 4–5% camphene, and 3–4% dipentene and other terpenes. My invention embraces the improved products per se as well as mineral oil compositions in which they are comprised as addends. It also embraces derivatives of the improved products and oil compositions comprising the derivatives.

I have discovered that the thermal stability of the turpentine-phosphorus sulfide condensates in mineral oils is markedly improved by employing in the reaction yielding the condensate, turpentine which has been pretreated for the removal of oxygen compounds. I have further discovered that such pretreatment of the turpentine or turpentine fraction greatly improves the odor of compounded oils comprising the condensation product. Heretofore, such oils have been distinguished by an extremely unpleasant mercaptan-like odor.

It has been known that the commercially available turpentines contain oxygen compounds but it apparently has never before been appreciated that these compounds upon employment of the turpentine in a reaction of the type involved in the May application could affect the thermal stability of the condensate in mineral oils or impart an undesirable odor thereto. The objectionable odor appears to derive from a reaction between the oxygen compounds and the phosphorus sulfide yielding sulfur derivatives of the former.

Although the removal of the oxygen impurities from the turpentine may be accomplished by any suitable method, I prefer to remove them by the method disclosed in the copending application of Milton P. Kleinholz, Serial No. 674,932, filed June 6, 1946, now Patent No. 2,453,712. Alternatively, the method described in my copending application Serial No. 674,923, filed June 6, 1946, now Patent No. 2,515,281, or the method described by George H. Splittgerber in his copending application, Serial No. 674,931, filed June 6, 1946, now Patent No. 2,461,007, may be used, for example. As will be demonstrated hereinafter, ordinary distillation will not suffice to remove the oxygen impurities nor will treatment with caustic soda, even at elevated temperature, but caustic treatment is sometimes useful as a preliminary measure to reduce peroxide content. In accordance with the method of the Kleinholz application, the turpentine is refluxed with an alkali metal alcoholate, 1 hour's refluxing being usually sufficient. The Splittgerber method comprises refluxing of the turpentine over barium oxide, while the method of my copending application involves metallic sodium as the principal reagent.

The reaction between the pretreated turpentine and the phosphorus sulfide, $P_2S_5$ or $P_2S_3$, yielding the condensate is best effected at an elevated temperature of the order of 200–300° F. Since the reaction is quite rapid and highly exothermic at such temperatures, it is advisable to the end that it will not become violent and uncontrollable, where substantial portions of the reactants are involved, to effect mixing of the reactants slowly at a temperature within the stated range rather than to pre-mix the reactants before applying heat. Despite the fact that the reaction is exothermic, heat is usually required to carry it to completion.

Exemplary of the procedure usually followed in the preparation of the condensate: The turpentine is placed in a flask and stirred while being heated to about 225° F. The phosphorus sulfide, in powdered form, is then added slowly with continued stirring in portions of, say, about 5% to 10% of the total amount to be added, and at such a rate that the temperature of the reaction does not exceed about 250° F. or drop below about 220° F. During this stage of the reaction no external heat need be applied. Following the addition of the last increment of phosphorus sulfide, heat is supplied to the reaction mixture as necessary to maintain it at a temperature of 225° F.–250° F., for example. Continuous stirring of the mixture throughout the reaction is desirable. The reaction is usually complete in from 2 to 4 hours. Upon its completion any excess turpentine may be removed by distillation.

Although the temperature at which the reaction is conducted is also a factor, the characteristics of the product depend chiefly upon the proportions of the reactants used. I generally employ from 1 to 9 parts by weight of turpentine for each part of sulfide. Within this range, the products are solid and resin-like upon topping off excess turpentine when present.

The condensation products resulting from the use of about 30% or less of the sulfide dissolve completely in lubricating oils. Those prepared using 33% to 40% or more of the sulfide contain matter not completely oil-soluble and, accordingly, are less desirable for use in lubricating oil compositions. The products as produced using 20% to 30% of phosphorus pentasulfide, $P_2S_5$, are especially advantageous for compounding with mineral oils. The combining equivalent of $P_2S_5$ with turpentine appears to be about 25% to 28% of the total weight of the reactants.

The lubricating oil composition of my invention may consist solely of the lubricating oil constituent and the turpentine-phosphorus sulfide condensate prepared with "deoxygenated" turpentine. However, my inhibitor has been found to be compatible with other lubricating oil addends and the inclusion of other addends is within the contemplation of my present invention and constitutes an important aspect thereof. The addition to internal combustion engine lubricants of detergent materials has been found highly desirable. An especially effective lubricating oil composition, for the lubrication of internal combustion engines and the like, contemplated by the present invention, is one comprising, in addition to the lubricating oil fraction and my inhibitor, a minor proportion of the calcium salt of iso-octyl salicylate or the calcium salt of capryl salicylate. These calcium salts have been found particularly effective as detergents in lubricating oil compositions used in internal combustion engines, as more fully described in the copending applications of Willard L. Finley, Serial No. 407,002, filed August 15, 1941, now Patent No. 2,347,547, and Serial No. 417,471, filed November 1, 1941, now Patent No. 2,339,692.

When used together, the calcium salt and my inhibitor have been found to complement each other so that the effectiveness of each is promoted. The phosphorus acidity of the inhibitor appears to be neutralized by the calcium salt, any tendency of the former to promote sludge formation being thereby minimized, while the tendency of the detergent to promote oxidation of the oil at the termination of its oxidation induction period is minimized by my inhibitor.

The proportion of the condensation product used in compounding my improved lubricating oil compositions may be varied somewhat but in any case only a minor proportion is used. In the absence of other addends, generally satisfactory results have been obtained by using proportions within the range of about 0.01% to about 0.5%, based on the weight of the lubricating oil constituent. In special cases, for example, when calcium salt detergents are present, somewhat higher proportions, say up to about 1%, may be used with advantage. In gear lubricants, these turpentine-$P_2S_5$ condensation products have been found to increase the film strength of the lubricant and, for such purposes, proportions somewhat in excess of those previously noted may be used. However, these condensation products are acidic phosphorus derivatives and phosphorus acidity has been found to have a general tendency to cause polymerization and sludge formation in mineral lubricating oil. In internal combustion engine lubricants, where sludge formations must be minimized, the use of the condensation product in proportions exceeding 0.5% by weight, in the absence of detergents such as previously noted, is not generally advisable. However, proportions within the indicated range of about 0.01% to 0.5% have not been found to cause noticeable or objectionable sludging under such conditions. Proportions within the range of about 0.05% to 0.10% are particularly recommended in the preparation of my lubricating oil composition for use in internal combustion engines in the absence of a detergent.

For optimum results, when used in conjunction with one of the previously noted detergents, the proportion of the inhibitor should not exceed that which will be neutralized by the calcium salt detergent, for, with an excess of the inhibitor, residual phosphorus acidity may remain with its characteristic tendency toward sludge formation. The optimum ratio of the inhibitor to the detergent will depend upon the basicity of the detergent and upon the amount of $P_2S_5$ equivalent in the inhibitor, and may be determined for any particular set of conditions by simple tests.

Detergents other than the above calcium salts which may be used, with advantage, in my mineral oil compositions include the barium phenolate of sulphurized diamyl phenol, currently marketed under the trade name "Aerolube B"; metallic phenolates of sulphurized tertiary amyl phenol, such as currently marketed under the trade names "Calcium Paranox" and "Barium Paranox"; a basic calcium detergent currently marketed under the trade name "C. M. 2A"; and various metallic soaps, metallic sulfonates, alcoholates or alkoxides and wax-alkylated salicylic acid salts.

As the mineral oil constituents of my improved lubricating oil composition, various petroleum lubricating oil fractions may be used, for instance solvent-treated Mid-Continent neutral or a blend of such Mid-Continent neutral and bright stock or a solvent-refined lubricating oil fraction from a Pennsylvania crude. Characteristics of several such oils which have been used with advantage are given in the following Table I in which Oil A, is a solvent-treated Mid-Continent neutral blended with 42% bright stock, Oils B and E are unblended solvent-treated Mid-Continent neutrals, Oil C is solvent-treated Pennsylvania S. A. E.-60 oil and Oil D is a solvent-treated Mid-Continent S. A. E.-10 oil.

TABLE I

| BASE OIL | A | B | C | D | E |
|---|---|---|---|---|---|
| Gravity, °A. P. I | 26.5 | 27.1 | 28.4 | 29.5 | 26.9 |
| Flash, °F | 425 | 470 | 540 | 405 | 490 |
| Fire, °F | 485 | 525 | 610 | 480 | 545 |
| Saybolt Viscosity at 100° F | 628.1 | 448.6 | 1,526.7 | 249.6 | 556.7 |
| Saybolt Viscosity at 210° F | 67.5 | 57.7 | 121.7 | 49 | 62.6 |
| Viscosity Index | 86.7 | 80.0 | 106 | 92.7 | 79.2 |
| Pour, °F | 10 | 5 | 10 | 5 | 0 |
| Carbon Residue | .26 | .04 | .58 | .039 | .06 |
| Ash | None | None | None | None | .004 |
| Acid No | .05 | | | .025 | .075 |
| Saponification No | | | .48 | .16 | |
| Color | 6— | 3½— | 5— | 2— | 3½+ |
| Sulfur, percent | .26 | .31 | .11 | .20 | .28 |

My condensation products prior to or following their addition to lubricating oils may be reacted with other substances with the production of derivatives of improved heat stability and odor. Thus, they may be reacted with an aliphatic alcohol, such as normal hexyl, capryl, or lauryl alcohol, or with an alkylated phenol, such as p-cyclohexyl phenol or diamyl phenol. It is also within the scope of my invention to further react products so obtained with still other materials, zinc oxide, for example. The condensates of my invention may, in other words, be dealt with in the same way as the products of May application, Serial No. 494,687 previously mentioned herein.

In this connection, reference is made to May Patents 2,356,073, granted August 15, 1944; 2,356,074, granted August 15, 1944; 2,392,252, granted January 1, 1946; 2,392,253, granted January 1, 1946; 2,379,312, granted June 26, 1946; and 2,379,313, granted June 26, 1945; and to May applications, Serial Nos. 545,193, now Patent No. 2,409,877, and 545,195, now Patent No. 2,409,878, both filed July 15, 1944.

Various aspects of my invention are illustrated by the following examples which are not to be taken as in any way restrictive of the scope thereof. The examples will be noted as in part comparative.

*Example 1*

A 1400 gram sample of Pinene 111 is refluxed for approximately 1 hours with 28 grams of sodium methylate powder following which the mixture is subjected to a distillation in which a fraction boiling at 156–157° C. is taken as the product.

Phosphorus pentasulfide is reacted with the thus purified turpentine fraction to obtain an oil soluble product conforming substantially to the characteristics indicated in the table below. The table also gives suitable reaction conditions.

TABLE II

| | |
|---|---|
| Turpentine: | |
| Grams | 368 |
| Mols | 2.7 |
| Phosphorus pentasulfide: | |
| Grams | 111 |
| Mols | 0.5 |
| Mol ratio (turpentine/$P_2S_5$) | 5.4/1 |
| Reaction time (hours) | 4 |
| Reaction temperature (°F.) | 275 |
| Atmosphere | Air |
| Stirring | Yes |
| Reaction product: | |
| Weight after filtering and topping | 359 |
| Weight per cent of $P_2S_5$ reacted | 100 |
| Phosphorus, per cent | 8.10 |
| Sulfur, per cent | 21.7 |
| Acid No. | 42.2 |
| Saponification No. | 138.1 |
| Mols turpentine reacted per mol of $P_2S_5$ | 3.84/1 |
| Solubility in oil (East Texas solvent-treated neutral) | Soluble |

A portion of the topped product is blended with 102 grams of a low viscosity Mid-Continent oil. 2¼ parts by weight of the resulting oil concentrate, after filtration to remove any insolubles, is mixed with 97¾ parts by weight of a Mid-Continent 20 or 30 motor oil. The odor of such a blend is much less offensive than that of a blend comprising a turpentine-phosphorus sulfide reaction product prepared with turpentine or Pinene 111 which has not been subjected to the alcoholate or similar treatment.

A second preparation with $P_2S_5$ (88 gms.) dissolved in 400 gms. turpentine is heated under reflux at 350° F. for 16 hours. No decomposition as would be indicated by the formation of a precipitate occurs. A precipitate is formed in 2 hours and progressively increases in quantity on further heating in the case of the turpentine-sulfide product as prepared with turpentine which has not been subjected to pretreatment for the removal of oxygen compounds.

*Example 2*

A sample of Pinene 111, 544 gms. (4 moles), is heated on a sand bath in a three liter, three-necked flask equipped with a mechanical stirrer. After the temperature reaches 250° F. the source of heat is removed and 222 gms., 1 mole, of phosphorus pentasulfide is added in small increments over a 90 minute period, the temperature of the exothermic reaction being thereby maintained at about 275° F. After the addition of the last increment of the phosphorus pentasulfide, the reaction is continued for 12 hours at 275° F., following which 176 gms., 1 mole, of p-cyclohexylphenol is added. After further reaction for 10 hours at 275° F., the mixture is blended with 1022 gms. of a low viscosity Mid-Continent oil. 2¼ parts by weight of the resulting oil concentrate, after filtration, is mixed with 97¾ parts by weight of a Mid-Continent SAE 20 motor oil. This blend has an offensive onion-like odor suggestive of mercaptans.

*Example 3*

A second sample of the Pinene 111 is distilled and 544 gms. of the overhead (boiling at 156–157° C.) is reacted with phosphorus pentasulfide and p-cyclohexylphenol, the procedure being the same as that described in Example 2 except that an atmosphere of nitrogen is maintained in the reaction flask. The odor of the final blend is equivalent to that of the final blend of Example 2.

*Example 4*

A 1400 gram sample of Pinene 111, from the same shipment as the Pinene 111 employed in Examples 2 and 3, is refluxed for about 1 hour with 28 grams of sodium methylate powder, following which the mixture is subjected to a distillation in which a fraction boiling at 156–157° C. is taken as the product. Employed in the procedure of Example 3, this product gives a blend which is nearly odorless.

*Example 5*

19.5 grams of metallic potassium is dissolved in 150 c. c. of anhydrous methanol and the solution added to 1000 grams of the Pinene 111. The excess alcohol is distilled off and the residual liquid refluxed for about 1 hour and distilled. A portion of the distillate boiling at 156–157° C. is employed in the procedure of Example 3. The odor of the final blend is much less offensive than that of the final blend in the case of either Example 2 or Example 3.

*Example 6*

A kilogram of the Pinene 111 is refluxed for 1 hour with 30 grams sodium methylate (powder). The mixture is then distilled to separate materials boiling below 155° C., and the residue cooled and filtered. A small volume of heavy liquid in the filtrate is separated by decantation and the remaining liquid refiltered until clear. A portion of the final filtrate, employed in the procedure of Example 3, gives a blend having an odor equivalent to that of the blend of Example 5.

*Example 7*

A 1000 gram sample of the same Pinene 111 is refluxed for 24 hours over 20 grams barium oxide and then distilled. That portion of the distillate boiling at 156–157° C., employed according to the procedure of Example 2, gives a blend which is relatively odorless.

*Example 8*

A 3000 gram sample of the same Pinene 111 is refluxed for 5 hours over metallic sodium and then distilled to separate a fraction boiling at 156-157° C. When a portion of this fraction is employed according to Example 3, the final blend is nearly odorless. A sample of ordinary turpentine, treated in a similar manner, gives a blend, which while more odoriferous than the blend prepared with the sodium-treated Pinene 111, is much superior in the respect of odor to a blend containing the turpentine phosphorus-sulfide reaction product prepared with untreated turpentine.

*Example 9*

A second portion of the fraction obtained in the distillation of Example 8 is employed according to Example 2. The final blend is relatively odorless as compared to the final blend of Example 2.

*Example 10*

Pinene 111, 1400 grams, was refluxed with 70 grams of a 40% aqueous sodium hydroxide solution for 8 hours to destroy peroxides. The organic layer was separated and distilled through a fractionating column, the overhead collected boiling at 156-157° C. The distillate was reacted and blended as in Example 3, giving a product with an odor equivalent to the blend of that example.

*Example 11*

Pinene 111, 750 grams, was refluxed with 15 grams sodium hydroxide (pellets) for 6 hours with stirring, and was then distilled. The distillate boiling at 156-157° C., was reacted and blended as in Example 3. The blend had an odor equivalent to that of the blends of Examples 2 and 3.

In the appended claims, it is to be understood that the term "turpentine" embraces not only commercial wood turpentine but also fractions such as the fractionated turpentine marketed under the name "Pinene 111" referred to in the forepart hereof and which consists predominately of alpha-pinene.

I claim:

1. As a new composition of matter, a product prepared by the reaction, at a temperature approximating 200°-300° F., of phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed, said product being capable of inhibiting the deterioration of lubricating oils and retarding the corrosion of metal surfaces contacted by such oils.

2. A composition as in claim 1 in which said phosphorous sulfide is phosphorous pentasulfide.

3. A compounded lubricating oil having as its major component a mineral lubricating oil and as a minor component present in a proportion approximating .01%-1.0% an addend to repress its deterioration, said addend being further capable of retarding the corrosion of metal surfaces to be contacted with the oil, said addend comprising a product prepared by the reaction at a temperature approximating 200-300° F. of phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed.

4. A compounded lubricating oil as in claim 3 in which said phosphorous sulfide is phosphorous pentasulfide.

5. As a new composition of matter, a derivative of a product prepared by the reaction, at a temperature approximating 200°-300° F. of phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed, said derivative being capable of inhibiting the deterioration of lubricating oils and retarding the corrosion of metal surfaces contacted by such oils.

6. A compounded lubricating oil having as its major component a mineral lubricating oil and as a minor component present in a proportion approximating .01%-1.0% an addend to repress its deterioration, said addend being further capable of retarding the corrosion of metal surfaces to be contacted with the oil, said addend comprising a derivative of a product prepared by the reaction, at a temperature approximating 200°-300° F. of phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed.

7. As a new composition of matter the reaction product of an alkylated phenol and a condensation product produced by condensing at a temperature approximating 200°-300° F. phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed, said reaction product being capable of inhibiting the deterioration of lubricating oils and retarding the corrosion of metal surfaces contacted by such oils.

8. A compounded lubricating oil having as its major component a mineral lubricating oil and as a minor component present in a proportion approximating 0.1%-1.0% an addend to repress its deterioration, said addend being further capable of retarding the corrosion of metal surfaces to be contacted with the oil, said addend comprising a reaction product of an alkylated phenol with a condensation product produced by condensing, at a temperature approximating 200°-300° F., phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed.

9. As a new composition of matter the reaction product of a p-cyclohexyl phenol and a condensation product produced by condensing at a temperature approximating 200°-300° F. phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed, said reaction product being capable of inhibiting the deterioration of lubricating oils and retarding the corrosion of metal surfaces contacted by such oils.

10. A composition as in claim 9 in which said phosphorous sulfide is phosphorous pentasulfide.

11. A compounded lubricating oil having as its major component a mineral lubricating oil and as a minor component present in a proportion approximating .01%–1.0% an addend to repress its deterioration, said addend being further capable of retarding the corrosion of metal surfaces to be contacted with the oil, said addend comprising a reaction product of a p-cyclohexyl phenol with a condensation product produced by condensing, at a temperature approximating 200°–300° F., phosphorus sulfide with a fractionated turpentine initially consisting essentially of about 92% of alpha-pinene, from about 4 to about 5% of camphene, from about 3 to about 4% of dipentene together with compounds containing oxygen and from which only the compounds containing oxygen have been removed.

12. A compounded lubricating oil as in claim 11 in which said phosphorous sulfide is phosphorous pentasulfide.

FRANKLIN M. WATKINS.

REFERENCES CITED

The following references are of record in the file of this patent:

UNITED STATES PATENTS

| Number | Name | Date |
|---|---|---|
| 895,003 | Chute | Aug. 4, 1908 |
| 1,854,165 | Humphrey | Apr. 12, 1932 |
| 1,926,648 | Powers | Sept. 12, 1933 |
| 2,379,312 | May | June 26, 1945 |
| 2,379,452 | Noland | July 3, 1945 |
| 2,381,377 | Angel et al. | Aug. 7, 1945 |
| 2,409,877 | May | Oct. 22, 1946 |
| 2,422,276 | Mikeska | June 17, 1947 |
| 2,453,712 | Kleinholz | Nov. 16, 1948 |

OTHER REFERENCES

"Organic Chemistry," Fieser and Fieser, 1944, Heath & Co., p. 49.